H. C. GREENWOOD.
SYNTHETIC PRODUCTION OF AMMONIA.
APPLICATION FILED FEB. 15, 1918.
1,312,534.
Patented Aug. 12, 1919.
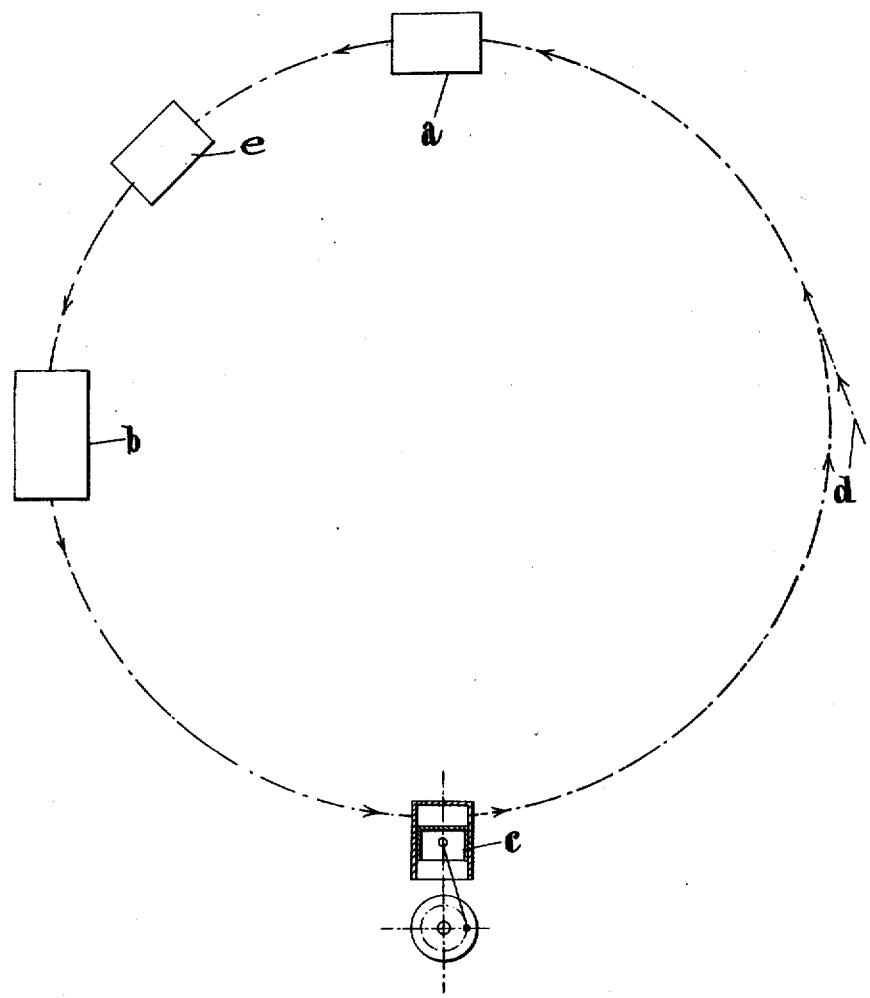
INVENTOR
H. C. Greenwood
BY H. R. Kerslake
ATTORNEY

UNITED STATES PATENT OFFICE.

HAROLD CECIL GREENWOOD, OF PUTNEY, LONDON, ENGLAND.

SYNTHETIC PRODUCTION OF AMMONIA.

1,312,534.     Specification of Letters Patent.     Patented Aug. 12, 1919.

Application filed February 15, 1918. Serial No. 217,443.

*To all whom it may concern:*

Be it known that I, HAROLD CECIL GREENWOOD, D. Sc., a subject of the King of Great Britain and Ireland, and residing at 10 University Mansions, Putney, London, S. W., England, have invented certain new and useful Improvements in the Synthetic Production of Ammonia, of which the following is a specification.

This invention relates to the synthetic production of ammonia by passing nitrogen and hydrogen together over a heated catalyst.

The object of the present invention is to increase the output for a given size of plant and to reduce the cost of production, and the invention consists in carrying out the reaction by passing the gases through or over the catalytic material at very high velocities so that a very considerable increase in the space-time-yield of the product, *i. e.*, the production per unit of time per unit of volume of catalyst, is effected.

The invention also comprises further features hereinafter described or indicated.

In carrying the invention into effect in one convenient manner, the apparatus adopted may be of the same general type and construction as that hitherto employed and may involve a converter containing the heated catalyst and means for circulating the gases through such converter.

It is already known that by carrying out the process under considerable pressure as, for example, 200 atmospheres, an improvement in the yield can be obtained, but with the use of such high pressures the dimensions of the catalyst space in any given unit are limited by the necessity of producing a converter which will safely withstand the high pressures employed, and thus any improvement which will increase the space-time-yield of the plant becomes of great technical importance.

According to the present invention the gases are passed through or over the catalytic material at very high velocities as, for example, at a velocity equivalent to the passage of, say, a volume of 1,250,000 liters (measured at ordinary pressure and temperature) per hour per liter of catalyst, and it is found that in this way the space-time-yield is enormously increased as compared with known methods of working, the yield in the particular example given being somewhere about 15 kilos of ammonia per hour per liter of catalyst at a pressure of 100 atmospheres.

The great increase in yield will be apparent when reference is had to a statement made by Bernthsen at the Eighth International Congress of Applied Chemistry, New York, September 11th, 1912, giving the space-time-yield as of the order of less than half a kilo at a pressure of 200 atmospheres.

If the production of ammonia be plotted with reference to the gas velocity, it is found that the curve obtained with a temperature of working of about 600° C. shows a maximum somewhere between the limits of 250,000 and 2,500,000 liters per hour (measured at ordinary pressure and temperature) per liter of catalyst, and that with further increase in velocity the production decreases, but it will be understood that the optimum of speed depends upon the particular catalyst employed and upon the temperature so that the velocity may be varied within the limits given in any manner that will be found to give most satisfactory results. Generally speaking, the higher the temperature, within certain limits, the greater the maximum space-time-yield, as for example, with an increase of temperature of 50° the maximum space-time-yield would be about doubled. While the invention is not to be limited to any particular pressure under which the reaction is carried out, it is found that the high speeds employed are suitable for pressures varying between 50 and 200 atmospheres.

Any suitable form of circulating pump may be employed for obtaining the desired velocity of gas flow and any usual or desired appurtenances or accessories may be provided in conjunction with the apparatus for carrying the invention into effect.

The catalyst is preferably heated by electrical means inside the pressure-withstanding converter, the walls of which are preferably cooled or maintained cool in order to avoid the exposing of heated metal to pressure, and in this case I may, if desired, apply the principle of heat regeneration or interchange described in the specification of copending application No. 217444 by causing the incoming gases to pass through tubes, the cross-sectional area of which is so proportioned in relation to the gas velocity that the "critical velocity" of the gas is exceeded, with the result that turbulent motion sets in and results in a more efficient interchange of heat between the incoming and outgoing gases.

When applying these high gas velocities to the synthetic production of ammonia, it has also been found that the output may be still further increased by employing nitrogen in excess of the quantity theoretically needed to convert the whole of the hydrogen into ammonia and represented respectively by the symbols $N_2$ and $3H_2$. An excess of from 10% to 20% gives good results.

A further advantage of the use of high gas velocities over the catalyst lies in the great reduction thus obtained in the effect of any "poison" that may be contained within the gas.

It is a matter of common knowledge that the effect of such poisons both on the reaction and the life of the catalyst bears a relation to the concentration of the same in the fluid medium or mixture of media, and the improvement forming the subject of this invention (according to which the poison is continuously removed from the system) has the effect of reducing the concentration of such poisons without any loss of efficiency in the main process. The process herein described is based on the further observation that in certain cases of catalysis, specific impurities are completely removed on passage of the fluid or mixture of fluids, even at very high rates of flow over the catalyst used for the main process, without effecting any chemical change in the catalyst, being converted into another substance which may be harmless.

An example of such a conversion presents itself in the case of the synthetic production of ammonia in which a mixture of hydrogen and nitrogen, preferably under high pressure, is passed over a catalyst at a temperature of, say 500° to 700° C. If a small percentage of carbon monoxid be present in the gaseous mixture and high pressures be employed, such carbon monoxid is quantitatively converted into methane with the simultaneous production of water. The methane is relatively innocuous except in so far as it tends to accumulate and consequently lower the partial pressure of the active constituents; while the water, which, like carbon monoxid, acts as a poison, does not increase in concentration, since it may be removed by suitable means, for example, cooling, in another section of the circulatory cycle. The consequence is that the concentration of poison does not tend to increase in the system.

The effect of using high velocities within certain limits is to reduce the concentration of the reaction product without effecting a diminution in the output, while the latter may actually increase. As a consequence of the diminished percentage of the reaction product, the ratio of the rate of circulation in the system to the rate of supply of fluid to the system increases. Now the concentration of poison or deleterious impurities in the fluid supplied to the system is diminished before passing over the catalyst in the proportion above mentioned.

Referring, for example, to the accompanying diagrammatic drawing, where $a$ represents the converter, $b$ the ammonia remover, $c$ the pump, $d$ the gas inlet and $e$ the means for removing the poison, it will be seen that if the fluid supplied to the system at $d$ contains 1% impurity, and the ratio of the rate of circulation to the rate of supply be 20 to 1, then if the poison be continuously removed, the concentration of the impurity obtained in the system is equal to $\frac{1}{20}\%$. It is consequently an advantage to increase this proportionate reduction by employing high circulation speeds, since this has the effect of increasing the ratio, speed of circulation—speed of supply.

It will be understood that the foregoing details are given by way of example only, as it will be clear that numerous modifications may be introduced into the construction and arrangement of the apparatus and into the means adopted for heating the catalyst and for circulating the gases under high velocities as may be found most suited to the particular application of the invention or any practical requirements that may have to be fulfilled.

What I claim is:—

1. A process for the synthetic production of ammonia according to which a mixture of hydrogen and nitrogen is passed over a heated catalyst at a velocity equivalent to the passage of a volume of the order of a million liters (measured at ordinary temperature and pressure) per hour per liter of catalyst space.

2. A process for the synthetic production of ammonia according to claim 1, in which an excess of nitrogen is employed.

3. A process according to claim 1, in which the water formed is removed at a convenient part of the system.

In testimony whereof I have signed my name to this specification.

HAROLD CECIL GREENWOOD.